April 23, 1957     W. A. EISELE     2,790,124
POSITIONING DEVICE
Filed Dec. 20, 1954
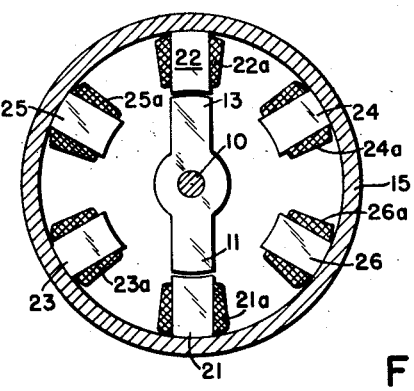
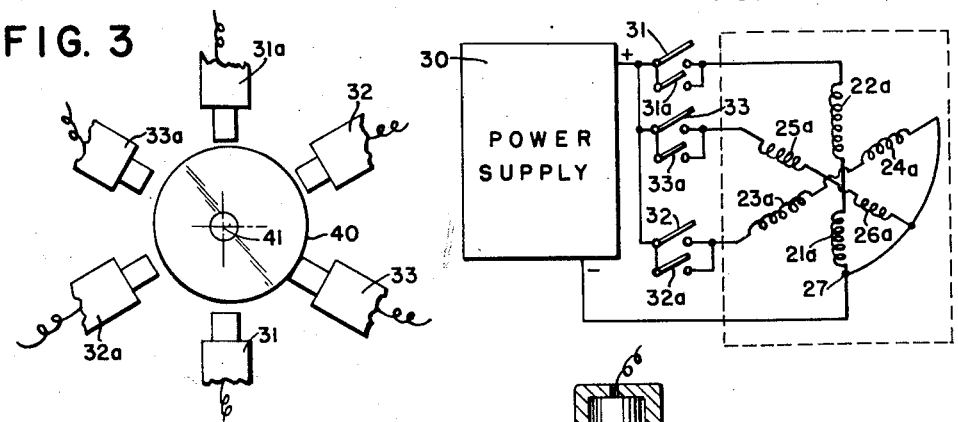
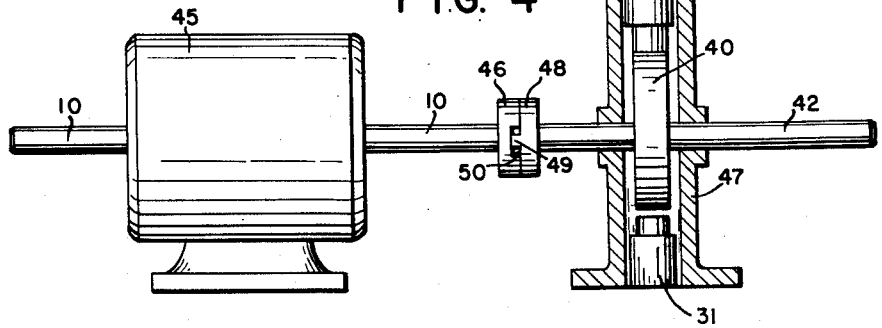
| STEP | SWITCH | STEP | SWITCH |
|---|---|---|---|
| 1 | - 31 | 8 | - 31a & 32 |
| 2 | - 31 & 32a | 9 | - 32 |
| 3 | - 32a | 10 | - 32 & 33 |
| 4 | - 32a & 33a | 11 | - 33 |
| 5 | - 33a | 12 | - 33 & 31 |
| 6 | - 33a & 31a | 1 | - 31 |
| 7 | - 31a | | |
FIG. 5
INVENTOR.
WILLIAM A. EISELE
BY
Ervin B. Steinberg
AGENT.

> United States Patent Office 2,790,124
Patented Apr. 23, 1957

2,790,124

POSITIONING DEVICE

William A. Eisele, Pleasantville, N. Y., assignor to The Reflectone Corporation, Stamford, Conn., a corporation of Connecticut Application December 20, 1954, Serial No. 476,150

5 Claims. (Cl. 318—254)

The present invention relates to positioning devices and has particular reference to a positioning device which may be used as a torque amplifying device.

One of the principal objects of the invention is the provision of a positioning device which is equipped with positive drive means.

Another object of the invention is the provision of a simple and relatively inexpensive torque amplifying device.

Another object of the invention is the provision of a positioning system which fails safe in case of power failure.

Still another object of the invention is the provision of a torque amplifying device which may be operated manually or automatically.

A still further object of the invention is the combination of a step motor and a switching means loosely coupled thereto so as to provide a predetermined angular displacement of the low torque input shaft before operation of the high torque output shaft occurs.

Another important object of the invention is the provision of a torque amplifying device with synchronous operation between input and ouput shafts.

One feature of the invention includes an electric motor which is equipped with a stator and a rotor. The stator is fitted with a plurality of field coils which are adapted to be sequentially energized with electric current to cause rotation of the rotor. An electric current switching means having at least one rotatable element is provided which upon rotation of its rotatable element causes sequential energizing the field coils. Coupling means for torsional coupling of the rotatable switch element with the rotor are provided and the coupling means have a backlash in excess of the arc subtended by one field coil.

For a better understanding of the present invention together with other and further objects thereof reference is made to the following description taken in connection with the accompanying drawings in which:

Figure 1 is a schematic vertical view, partly in section, of a typical step motor used for the instant positioning device.

Figure 2 is a schematic circuit diagram of the connections employed to obtain operation of the motor shown in Figure 1.

Figure 3 is a schematic vertical view of a typical switching device which may be employed to operate the motor.

Figure 4 is a schematic vertical view, partly in section, of the switching device coupled to the step motor in order to obtain the positioning device described hereinafter, and Figure 5 is a tabulation listing the connections to be made to effect rotation of the step motor.

Referring now to Figure 1, an electric motor is described which is related to the class of step motors, a variation of which is more clearly described in United States Patent Number 2,683,230 dated July 6, 1954 of Nils B. Mickelson, entitled "Electro-Magnetic Device."

Numeral 10, in general, identifies a motor shaft upon which there is mounted a two-pole rotor having salient poles 11 and 13. The rotor is made preferably of soft magnetic iron.

The stator of the motor comprising housing 15 is equipped with three pairs of pole pieces, namely pole pieces 21 and 22, pole pieces 23 and 24, and pole pieces 25 and 26. Each pole piece is surrounded by a field coil 21a, 22a, 23a, 24a, 25a and 26a respectively.

Figure 2 shows schematically the electrical connections of the field coils which surround the pole pieces. The field coils of each set of pole pairs are series connected and one terminal of the three pairs terminates at a common junction 27. This junction point 27 is connected to a terminal identified as the minus potential of a power supply 30. The other end of series connected field coils 21a and 22a terminates at a circuit switch 31, series connected field coils 23a and 24a at a circuit switch 32, and coils 25a and 26a at a switch 33. Each of these switches, i. e. circuit switch 31, 32 and 33, is connected to the positive terminal of power supply 30. Furthermore, switch 31 is connected in parallel with a switch 31a, switch 32 parallel connected with a switch 32a and circuit switch 33 parallel connected with a circuit switch 33a.

The physical arrangement of these switches is illustrated in Figure 3 wherein the six circuit switches are disposed around the circumference of an eccentric cam 40 which rotates about axis 41. This cam is shaped in such a manner that as it rotates it successively closes a first switch; then closes a second switch, the first switch remaining closed; then opens the first switch, the second switch remaining closed; then closes a third switch, the second switch remaining closed, etc., as tabulated in Figure 5. This sequential closing may be visualized as follows:

As a first step, switch 31 is closed. This will energize field coils 21a and 22a thereby aligning poles 11 and 13 as shown in Figure 1. As a next step, switch 32a is energized in addition to switch 31 remaining closed. This step will energize field coils 23a and 24a in addition to field coils 21a and 22a, thus causing the rotor in Figure 1 to advance 30 degrees in a clockwise direction.

As a next step, switch 32a is energized alone, thus sending electric current through windings 23a and 24a only which causes the rotor to advance another 30 degrees, salient pole 11 becoming aligned opposite stator pole 23 and pole 13 opposite stator pole 24.

In the next successive steps, circuit switches 32a and 33a are energized, then switch 33a alone, then 33a and 31a, then switch 31a alone at which time the two-pole rotor will have revolved through 180 degrees, pole 11 being disposed opposite stator pole 22. For a complete 360 degree revolution reference is made to Figure 5. It will be obvious that by varying the energizing of the switches in analogous fashion counterclockwise rotation can be obtained.

Figure 4 depicts the arrangement of the switching device of Figure 3 in connection with a step motor illustrated in Figure 1. Step motor 45, if energized as described above, causes rotor shaft 10 to revolve. The rotor shaft is equipped on one end with half coupling 46. The rotatable cam 40 of the switch element is shown mounted on a shaft 42 which is journalled in a housing 47. Shaft 42 is also fitted with a half coupling 48 which mates with coupling 46. The half coupling 48 is equipped with one or more driving teeth 49 which engage peripheral notches 50 of coupling half 46. An important feature of the instant disclosure recites in the fact that the notch 50 is of considerable greater width than the driving tooth 49 so that there is between shaft 10 and shaft 42 a rotational play or backlash which is greater than the angle subtended by one field coil and which is substantially as great as the arc subtended by three consecutive rotor positions.

The operation of this device may be visualized as follows:

Shaft 42 represents the low torque input whereas shaft 10 represents the high torque output shaft of the device. When turning shaft 42 in clockwise or counter-clockwise direction shaft 10 will follow this rotation although there is a time or rotational lag. By virtue of this arrangement it is possible to rotate shaft 42 substantially without power, the only power required being the effort to turn the switch from one position to the next. By virtue of the backlash being substantially the arc subtended by three consecutive rotor positions it is possible to operate the amplifying device in either clockwise or counter-clockwise direction. In case of power failure it is possible to drive shaft 10 directly from shaft 42 through coupling 46—48 thus obtaining a device which is commonly known as "falling safe." It is furthermore possible to equip the rotor of the step motor with suitable inertia so as to keep the rotor rotating when an initial "twist or spin" is applied to shaft 42. Thus, the rotor is possessed with sufficient momentum to rotate past the energized pole position, absorbing the backlash in the coupling, and thereby forcing the switch to advance to the next switch position. This action will supply a new pulse of power to the step motor causing the rotor to carry the switching device to the next successive position and so on. When trying to stop this continuous rotation, it is necessary merely to grasp shaft 42 and stop rotation thereof, thereby countering the inertia of the step motor and bringing the device to a stop.

Aside from the broad principle and feature of torque amplification it will be apparent to those skilled in the art that this device is extremely useful for positioning purposes where coarse and fine positioning is desired. Also the instant device can be used advantageously for "zeroing in" of control adjustments.

While there has been described and illustrated a specific embodiment of the invention, it will be obvious that various changes and modifications may be made therein without departing from the field of the invention which should be limited only by the scope of the appended claims.

What is claimed is:

1. A positioning device comprising an electric motor having a stator and a rotor; said stator equipped with a plurality of field coils adapted to be selectively energized with electric current to cause said rotor to assume positions responsive to said energized coils; electric circuit switching means having at least one rotatable element which is adapted to cause upon rotation selective energizing of said field coils; means for torsionally coupling said rotatable switch element with said rotor and said coupling means provided with a backlash in excess of the arc subtended by one field coil.

2. A positioning device comprising an electric motor having a stator and a rotor; said stator equipped with a plurality of field coil pairs which when selectively energized with electric current cause said rotor to assume rotational positions responsive to the field coils energized; an electric circuit switching means comprising a rotatable element and a plurality of circuit switches; said rotatable element cooperating with said circuit switches to cause upon rotation thereof selective energizing of said field coils; means for torsionally coupling said rotatable switch element with said rotor, and said coupling means provided with a backlash of substantially the arc subtended by three consecutive rotor positions.

3. A positioning device comprising an electric motor having a stator and a rotor; said stator equipped with a plurality of field coil pairs which when selectively energized with electric current cause said rotor to assume rotational positions responsive to the field coils energized; an electric circuit switching means comprising a rotatable element and a plurality of circuit switches; said rotatable element cooperating with said circuit switches to cause upon rotation thereof selective energizing of said field coils; direct drive coupling means disposed between said rotatable switch element and said rotor, and said coupling means provided with a rotational backlash substantially equal to the arc subtended by three consecutive rotor positions.

4. A positioning device comprising an electric motor having a stator and a salient pole rotor; said stator equipped with a plurality of field coil pairs which when selectively energized with electric current cause said rotor to assume rotational positions responsive to the field coils energized; an electric circuit switching means comprising a rotatable cam and a plurality of circuit switches adapted to be actuated by said cam, a pair of circuit switches for each pair of field coils; said rotatable cam cooperating with said circuit switches to cause upon rotation thereof selective energizing of said field coils; means for loose rotational coupling of said rotatable cam with said rotor, and said coupling means provided with a rotational play of substantially the arc subtended by three consecutive rotor positions.

5. A positioning device comprising an electric motor having a stator and a salient pole rotor; said stator equipped with a plurality of field coil pairs which when selectively energized with electric current cause said rotor to advance in step by step fashion to assume rotational positions responsive to the field coils energized; an electric circuit switching means comprising a rotatable cam and a plurality of circuit switches adapted to be sequentially actuated by said cam, a pair of circuit switches for each pair of field coils; said rotatable cam cooperating with said circuit switches to cause upon rotation thereof selective energizing of said field coils; means for rotational coupling of said rotatable cam with said rotor, and said coupling means provided with a rotational play of substantially the arc subtended by three consecutive rotor positions.

References Cited in the file of this patent
UNITED STATES PATENTS

| Number | Name | Date |
|---|---|---|
| 1,367,679 | Adsit et al. | Feb. 8, 1921 |
| 1,813,764 | Prince | July 7, 1931 |
| 2,555,097 | Rotureau | May 29, 1951 |
| 2,624,017 | Putnocky | Dec. 30, 1952 |